Jan. 21, 1930.   A. M. TAYLOR   1,744,422
FRUIT AND VEGETABLE CUTTER

Filed Nov. 11, 1925

WITNESSES:
1. Mabel McCall.
2. Vivian McCall

Anna May Taylor
INVENTOR.

BY  A.B. McCall.
ATTORNEYS.

Patented Jan. 21, 1930

1,744,422

UNITED STATES PATENT OFFICE

ANNA MAY TAYLOR, OF SPRINGFIELD, ILLINOIS

FRUIT AND VEGETABLE CUTTER

Application filed November 11, 1925. Serial No. 68,293.

My invention relates to a class of fruit and vegetable cutters adapted to be operated by hand in cutting fruit, vegetables and the like.

One of the purposes of this invention is to provide a hand cutter for vegetables, fruits and the like, that may be economically manufactured, easily operated, and conveniently changed from one design of cutter to another.

A particular object of this invention is to cut fruit, vegetables and the like in any one of a number of designs of slices or to core fruit while slicing the same.

A further object of my invention is to provide a fruit and vegetable cutter provided with a plurality of detachable cutters of a plurality of designs.

I attain the objects of my invention above mentioned by the devices described in the annexed specifications, recited in the claims and illustrated in the accompanying drawings in which like reference numerals refer to the same structural parts in the several figures.

Referring to the figures,

Figure 1 is a side elevation showing a partial section of the tubular frame member of my invention as well as a partial section of one of the cutters heads secured thereto.

Fig. 2 is a vertical half section of one of the cutter heads adapted to be screwed onto the tubular frame member.

Figure 7:
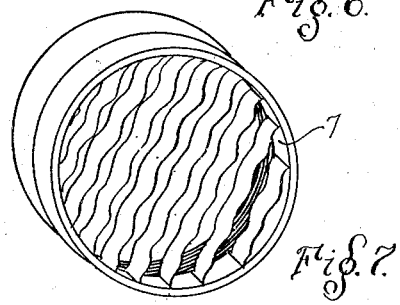

Figure 7 is a cutter head for slicing vegetables or fruit into wavy slices.

Figure 8:
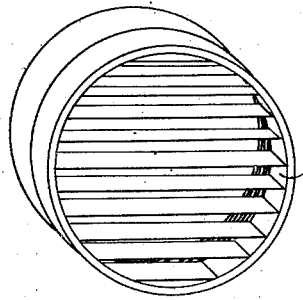

Fig. 8 is a cutter head adpated to slice fruit or vegetables into smooth flat slices.

In pointing out the details of this device it will be seen that like numerals indicate like parts in the several figures.

When a cook is preparing fruit or vegetables for cooking purposes, it usually takes a great deal of time to pare and slice apples, pears, potatoes, and the like, if it is done by hand with a paring knife, but with my fruit and vegetable cutter it will be found that a great deal of time can be saved in preparing such fruits and vegetables since after paring it is only necessary to shove the cutter of my invention down over the fruit or vegetable and in one stroke to completely slice it or in the case of apples and pears to slice it and core it all in one stroke.

Referring now to the details of structure in my device: A frame member —1— is provided with a handle —2— on one end and an annular shoulder at the base of threads —3— on the other while a plurality of threaded detachable cutter heads —4—5— 6—7 and —8— are adapted to be screwed on to tubular frame member —1— in the position at the threads —3—; said handle member and said cutter head of equal outside diameter.

Figure 1:
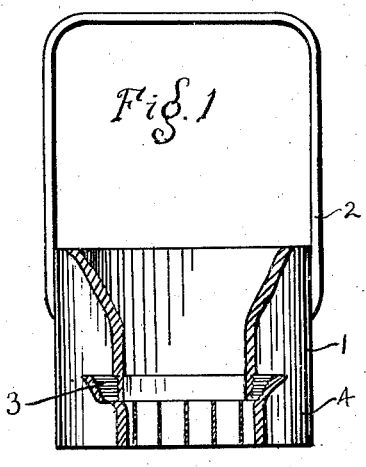
Figure 4:
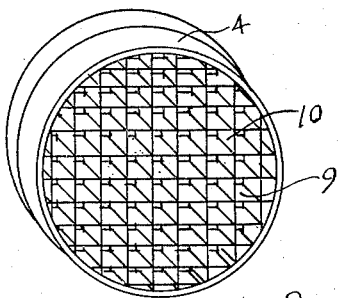
Fig. 4 is oblique drawing of one of the cutter heads adapted to cut french fried potatoes.
Figure 2:
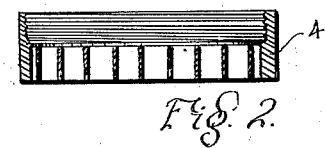
Figure 5:
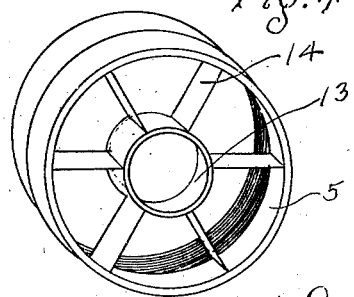
Fig. 5 is a similar drawing of the cutter, head adapted to core and slice apples in one stroke.
Figure 3:
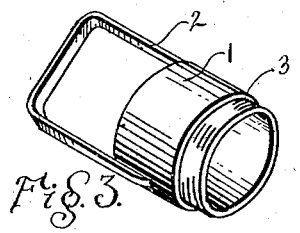
Fig. 3 is a perspective of the tubular frame member exposing to view the threads adapted to hold the cutter heads in operative position.
Figure 6:
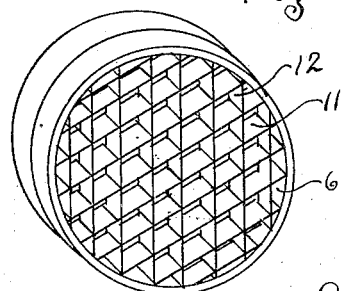
Fig. 6 illustrates a cutter head adapted to cut fruit or vegetables in diamond shaped strips.

It will be seen that it will be particularly advantageous to have a group of designs of cutters for the reason that one cutter head may be used in cutting French potatoes, Fig. 4, another for slicing potatoes Fig. 8, in straight flat slices, another for slicing potatoes in wavy slices, Fig. 7, and another for cutting potatoes in strips of diamond shape, Fig. 6 while another cutter head shown in Fig. 5 has the knives arranged suitable for coring and slicing an apple or pears and the like all in one stroke.

It will be readily seen that to provide a separate complete outfit for each design of cutters and for every purpose would be expensive and otherwise objectionable, but in my invention I provide these detachable cutter heads for knives arranged in the respective positions shown the the several figures where it will be seen that in one type of cutter head knives —9— are arranged parallel to each other and adapted to be positioned at right angles to a similar group —10— of knives whereby french fried potatoes may be cut.

This cutter head is shown in Figure —4— while in Figure 6 the knives —11— are arranged in diamond shape spaced relation with knives —12— and in Figure —5— a central tubular knife —13— connects with a plurality of radiating knives —14— whereby an apple may be cored and sliced all in one stroke.

To those skilled in the art it will be evident that other suitable arrangements of cutting knives could be made in other cutter heads but the preferred arrangements of such knives are illustrated in the drawings and have been herein above described.

Having thus described the nature of my invention what I claim is:

A fruit and vegetable cutter including a cylindrical tubular frame member externally threaded at one end and provided with a shoulder at the base of the threads against which a detachable ring of the cutter is screwed; said ring provided with internal threads and having the same external cylindrical dimensions as the frame member; said ring further provided internally with cutting blades each terminating at the sharp end in the same plane as the end of the ring.

In witness whereof I hereunto set my hand this 1st day of October, 1925.

ANNA MAY TAYLOR.